(12) United States Patent
Miura et al.

(10) Patent No.: US 11,808,655 B2
(45) Date of Patent: Nov. 7, 2023

(54) VIBRATION ISOLATION HOLDING DEVICE

(71) Applicant: MITSUBISHI HEAVY INDUSTRIES ENGINE & TURBOCHARGER, LTD., Sagamihara (JP)

(72) Inventors: Shuichi Miura, Tokyo (JP); Hideo Mori, Sagamihara (JP); Takanori Shoji, Sagamihara (JP); Yosuke Dammoto, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 476 days.

(21) Appl. No.: 17/050,215

(22) PCT Filed: Sep. 6, 2018

(86) PCT No.: PCT/JP2018/033010
§ 371 (c)(1),
(2) Date: Oct. 23, 2020

(87) PCT Pub. No.: WO2020/049680
PCT Pub. Date: Mar. 12, 2020

(65) Prior Publication Data
US 2021/0239561 A1    Aug. 5, 2021

(51) Int. Cl.
*G01M 1/04* (2006.01)
*B04B 9/14* (2006.01)
(Continued)

(52) U.S. Cl.
CPC .............. *G01M 1/04* (2013.01); *B04B 9/146* (2013.01); *F16F 15/04* (2013.01); *F05D 2260/15* (2013.01)

(58) Field of Classification Search
None
See application file for complete search history.

(56) References Cited

U.S. PATENT DOCUMENTS

| 2007/0006393 A1 | 1/2007 | Ishida et al. |
| 2010/0191380 A1 | 7/2010 | Maeda |

(Continued)

FOREIGN PATENT DOCUMENTS

| CN | 101688816 A | 3/2010 |
| CN | 108223606 A | 6/2018 |

(Continued)

OTHER PUBLICATIONS

Chinese Office Action and Search Report for Chinese Application No. 201880087671.2 dated Sep. 28, 2021.

(Continued)

*Primary Examiner* — Daniel S Larkin
(74) *Attorney, Agent, or Firm* — Birch, Stewart, Kolasch & Birch, LLP (57) ABSTRACT

A vibration isolation holding device includes a body portion and an abutment member. The abutment member is arranged between the body portion and a bearing housing, and has an abutment surface abutting on the bearing housing, when a cartridge is held. A biasing member is disposed between the abutment member and the body portion. An interval between the body portion and the abutment member is regulated by a first regulating portion to be shorter than a natural length of the biasing member.

10 Claims, 8 Drawing Sheets

(51) Int. Cl.
  *B04B 15/04* (2006.01)
  *F16F 15/04* (2006.01)

(56) References Cited

U.S. PATENT DOCUMENTS

| | | |
|---|---|---|
| 2019/0162622 A1 | 5/2019 | Miura et al. |
| 2019/0212220 A1 | 7/2019 | Miura et al. |

FOREIGN PATENT DOCUMENTS

| | | |
|---|---|---|
| DE | 19853078 C | 7/2000 |
| EP | 2 581 553 A1 | 4/2013 |
| GB | 2058293 A | 4/1981 |
| JP | 2004-278580 A | 10/2004 |
| JP | 3835501 B2 | 10/2006 |
| JP | 4232841 B2 | 3/2009 |
| JP | 2018-91808 A | 6/2018 |
| WO | WO 2005/026574 A1 | 3/2005 |
| WO | WO 2017/203649 A1 | 11/2017 |
| WO | WO 2018/105499 * | 6/2018 ............ G01M 1/16 |
| WO | WO 2018/105499 A1 | 6/2018 |

OTHER PUBLICATIONS

Japanese Office Action and English translation for Japanese Application No. 2020-540940, dated Aug. 17, 2021.
Extended European Search Report, dated Feb. 5, 2021, for European Application No. 16932584.8.
International Preliminary Report on Patentability and Written Opinion of the International Searching Authority with an English translation, dated Mar. 18, 2021, for International Application No. PCT/JP2018/033010.
International Search Report, dated Dec. 11, 2018, for International Application No. PCT/JP2018/033010, with an English translation.

* cited by examiner

VIBRATION ISOLATION HOLDING DEVICE

TECHNICAL FIELD

The present disclosure relates to a vibration isolation holding device for holding a cartridge, which includes a rotor having a wheel and a rotational shaft, a bearing for supporting the rotor rotatably, and a bearing housing for housing the bearing, while isolating an external vibration.

BACKGROUND

A cartridge, which is a core component of a turbocharger, undergoes a balancing work for a rotor forming the cartridge, after being assembled (for example, Patent Document 1). This balancing work includes an unbalance detection work for detecting unbalance of the rotating rotor, and is a series of works including, for example, slightly grinding a part of the rotor to balance the rotor if unbalance of the rotor is detected. By performing the balancing work on the rotor during production, it is possible to prevent vibration upon rotation due to unbalance of the rotor that rotates at a high speed during operation of an engine, as well as noise and breakage due to the vibration.

In the unbalance detection work, more specifically, while the cartridge is supported (fixed) with an unbalance detection device, a fluid, such as air, is supplied to the rotor to rotary drive the rotor, and vibration upon rotation generated due to unbalance of the rotor is detected with an acceleration sensor (vibration sensor). The phase of the rotor that generates the vibration is specified based on a relationship between a vibration signal detected with the acceleration sensor and a phase of the rotor detected simultaneously with the vibration signal. Subsequently, the rotor is ground for balancing, and a relationship between the mass to be ground (unit weight) and a change in magnitude of vibration accompanying the grinding (effect vector) is obtained in advance through experiments by using a cartridge of the same model (product). Then, based on the above-described vibration signal, phase, and effect vector (experiment result), grinding information that includes the optimum mass (weight) and position for balancing of the rotor is calculated, and the rotor is ground based on the grinding information.

Meanwhile, in the unbalance detection work, there is known a clamping method of supporting the cartridge from both sides by pressing two housing members against a bearing housing included in the cartridge from both sides. Compared with a bolt-fixing method of fixing the two housing members, which support the bearing housing from both sides, to each other by bolts, the clamping method, which does not need a work of fastening/removing bolts, is advantageous for reducing a working time and cost, can obtain good productivity, and is suitable for mass-produced cartridges.

However, in the clamping method, the two housing members are not fixed firmly with bolts as in the bolt-fixing method, and thus stability in supporting the cartridge is not as high as the bolt-fixing method. Moreover, a difference in manner of contact (manner of abutment) between the bearing housing and the housing member, which are in direct contact with each other, is likely to influence the vibration characteristics in rotation of the rotor, such as a resonance point between the cartridge side and device described above is changed. Consequently, it is difficult to calculate the grinding information accurately, as well as deterioration of yielding such as resulting in defective products may be caused. In particular, if it is necessary to perform a work of re-clamping the cartridge to the unbalance detection device to optimize the manner of contact between the bearing housing and the housing member, it leads to a decrease in productivity of the cartridge.

In order to solve such a problem of the clamping method, a method of increasing a pressing force (clamping force) applied to the bearing housing by the two housing members is considered. However, the increase in pressing force is limited, in terms of the strength of the cartridge. Thus, Patent Document 2 describes that using a vibration isolation member including elastically deformable flexible support portions between a bearing housing and two housing members supporting a cartridge from both sides to achieve vibrational isolation (decrease in transmitted vibration) between the cartridge and the housing members, suppressing an influence due to the difference in manner of contact between the housing members and the bearing housing under the limited pressing force.

CITATION LIST

Patent Literature

Patent Document 1: JP4232841B
Patent Document 2: JP2018-91808A

SUMMARY

Technical Problem

In Patent Document 2 described above, vibration isolation between the cartridge and the housing members is performed by using the vibration isolation member. The vibration isolation member includes the flexible support portions each composed of an elastically deformable wavelike plate spring portion between an outer ring part and an inner ring part. There is not a little variation due to an individual difference in elastic characteristics. Moreover, for good vibration isolation, while a vibration isolation member having higher elasticity is preferred, a strength for ensuring sufficient stability is also required when the rotor is rotated. In the vibration isolation member in Patent Document 2, the flexible support portions have to be formed rigidly to some extent in order to sufficiently ensure the clamping force from both sides with respect to the cartridge. Thus, an improvement in vibration isolation property is limited.

Moreover, since a working space is limited in a production site where this kind of unbalance detection work is performed, it is necessary to implement a means that satisfies the above-described request in the limited space.

At least one embodiment of the present invention is made in view of the above, and an object of the present invention is to provide a vibration isolation holding device that can stably hold the cartridge while performing good vibration isolation and can be used in the limited working space.

Solution to Problem (1) In order to solve the above-described problems, a vibration isolation holding device according to at least one embodiment of the present invention is a vibration isolation holding device for holding a cartridge, which includes a rotor having a wheel and a rotational shaft, a bearing for supporting the rotor rotatably, and a bearing housing for housing the bearing, while isolating a vibration, the device including a body portion, an abutment member arranged between the body portion and the bearing housing, and having an abutment surface abutting on the bearing housing, when the cartridge is held, a biasing member disposed between the body portion and the abutment member, and a first regulating portion for regulating a position of the abutment member with respect to the body portion, so as to make an interval between the body portion and the abutment member shorter than a natural length of the biasing member.

With the above configuration (1), the position of the abutment member is regulated to contact the first regulating portion by the load (biasing force) received from the biasing member, if the load received by the abutment surface from the bearing housing is not greater than a predetermined value, when the cartridge is held. On the other hand, if the load received by the abutment surface from the bearing housing exceeds the predetermined value, the abutment member, which is in contact with the first regulating portion, is diverged from the first regulating portion against the load (biasing force) received from the biasing member, and moves toward the body portion. At this time, the cartridge is elastically held by the body portion via the biasing member in a state where the abutment member is in contact with the bearing housing. Such an elastic holding structure allows a sufficient clamping force to act on the bearing housing, while ensuring a good vibration isolation property even if the very flexible biasing member is used. Moreover, since the length of the biasing member is regulated to be always not greater than the natural length by the first regulating portion, it is possible to keep the device size compact and also to easily introduce the device into a limited working space.

(2) In some embodiments, in the above configuration (1), the natural length of the biasing member is longer than an interval between the body portion and the first regulating portion.

With a above configuration (2), the biasing member disposed between the body portion and the abutment member has the natural length which is longer than the interval between the body portion and the first regulating portion. In general, the biasing member, such as a spring, is the very flexible biasing member, and the natural length thereof needs to be increased in order to exert a sufficient clamping force. In the present configuration, since the length of the biasing member is regulated by the first regulating portion even if such a biasing member having the long natural length is used, it is possible to achieve the sufficient clamping force under a good vibration isolation property while being applied to the limited working space.

(3) In some embodiments, in the above configuration (1) or (2), the first regulating portion is fixed to the body portion, and is configured to be able to contact the abutment surface from on opposite side to the body portion as viewed from the abutment member.

With the above configuration (3), the first regulating portion is configured to contact the abutment member from the side of the abutment surface, if a load from the bearing housing on the abutment surface is not greater than a predetermined value. Thus, the length of the biasing member is accurately regulated not to be greater than the natural length.

(4) In some embodiments, in the above configuration (3), the body portion is a disc-shaped member crossing an axial direction of the rotational shaft, when the cartridge is held, and the first regulating portion is configured to protrude radially inward from a side wall extending from a circumferential edge of the disc-shaped member along the axial direction.

With the above configuration (4), since the first regulating portion is disposed along the circumferential edge of the body portion which is the disc-shaped member, it is possible to stably regulate the orientation and operation range of the abutment member, which moves in accordance with a balance between a pressing force from the bearing housing and a biasing force of the biasing member. Adopting such a stable structure, it is possible to achieve good reliability even if the present device is introduced into an automated production line, for example.

(5) In some embodiments, in any one of the above configurations (1) to (4), the vibration isolation holding device includes a second regulating portion for regulating displacement in a radial direction of the biasing member.

With the above configuration (5), since displacement of the abutment member in the radial direction of the biasing member is regulated, the abutment member is prevented from being disturbed in its orientation when moving against the biasing force from the biasing member. Thus, it is possible to hold the cartridge more stably.

(6) In some embodiments, in any one of the above configurations (1) to (5), the vibration isolation holding device includes a third regulating portion configured to contact the abutment member from an opposite side to the abutment surface, if a load from the bearing housing on the abutment surface exceeds a preset upper limit reference value.

With the above configuration (6), the abutment member contacts the third regulating portion from the opposite side to the abutment surface, if the load from the bearing housing on the abutment surface exceeds the preset upper limit reference value, thereby regulating the operation range. Thus, it is possible to prevent the biasing member from being excessively compressed, even if the excessive load is applied to the abutment surface from the cartridge. As a result, for example, plastic deformation in the biasing member is prevented, making it possible to implement a highly reliable holding device.

(7) In some embodiments, in any one of the above configurations (1) to (6), a plurality of biasing members are disposed along a circumferential direction, centered on an axial direction of the rotational shaft.

With the above configuration (7), the abutment member is connected to the body portion via the plurality of biasing members disposed along the circumferential direction, centered on the axial direction of the rotational shaft. Thus, since the abutment member is supported by the body portion via the plurality of biasing members, the abutment member is stabled in its orientation when moving against the biasing force by the biasing member, making it possible to hold the cartridge more reliably.

(8) In some embodiments, in the above configuration (7), the biasing member has a small elastic coefficient in an operation range of the abutment member, as compared with another range.

With the above configuration (8), the biasing member disposed between the body portion and the abutment member has the small elastic coefficient in the operation range of the abutment member, as compared with the another range. Thus, for example, it is possible to implement a compact configuration, while holding the cartridge with a flexible elastic force in the operation range of the abutment member. On the other hand, since the elastic coefficient decreases outside the operation range, excessive deformation in the biasing member is prevented, obtaining good reliability.

(9) In some embodiments, in any one of the above configurations (1) to (8), the wheel is a turbine wheel, and the body portion is connected to a turbine housing configured to surround the turbine wheel.

With the above configuration (9), applying the vibration isolation holding device on the side of the turbine wheel included in the cartridge, it is possible to achieve good vibration isolation at the time of an unbalance detection work.

(10) In some embodiments, in any one of the above configurations (1) to (8), the wheel is a compressor wheel, and the body portion is connected to a compressor housing configured to surround the compressor wheel.

With the above configuration (10), applying the vibration isolation holding device on the side of the compressor wheel included in the cartridge, it is possible to achieve good vibration isolation at the time of the unbalance detection work.

Advantageous Effects

According to at least one embodiment of the present invention, it is possible to provide a vibration isolation holding device that can stably hold a cartridge while performing good vibration isolation and can be used in a limited working space.

DETAILED DESCRIPTION

Some embodiments of the present invention will be described below with reference to the accompanying drawings. It is intended, however, that unless particularly identified, dimensions, materials, shapes, relative positions and the like of components described in the embodiments or shown in the drawings shall be interpreted as illustrative only and not intended to limit the scope of the present invention.

Figure 1:
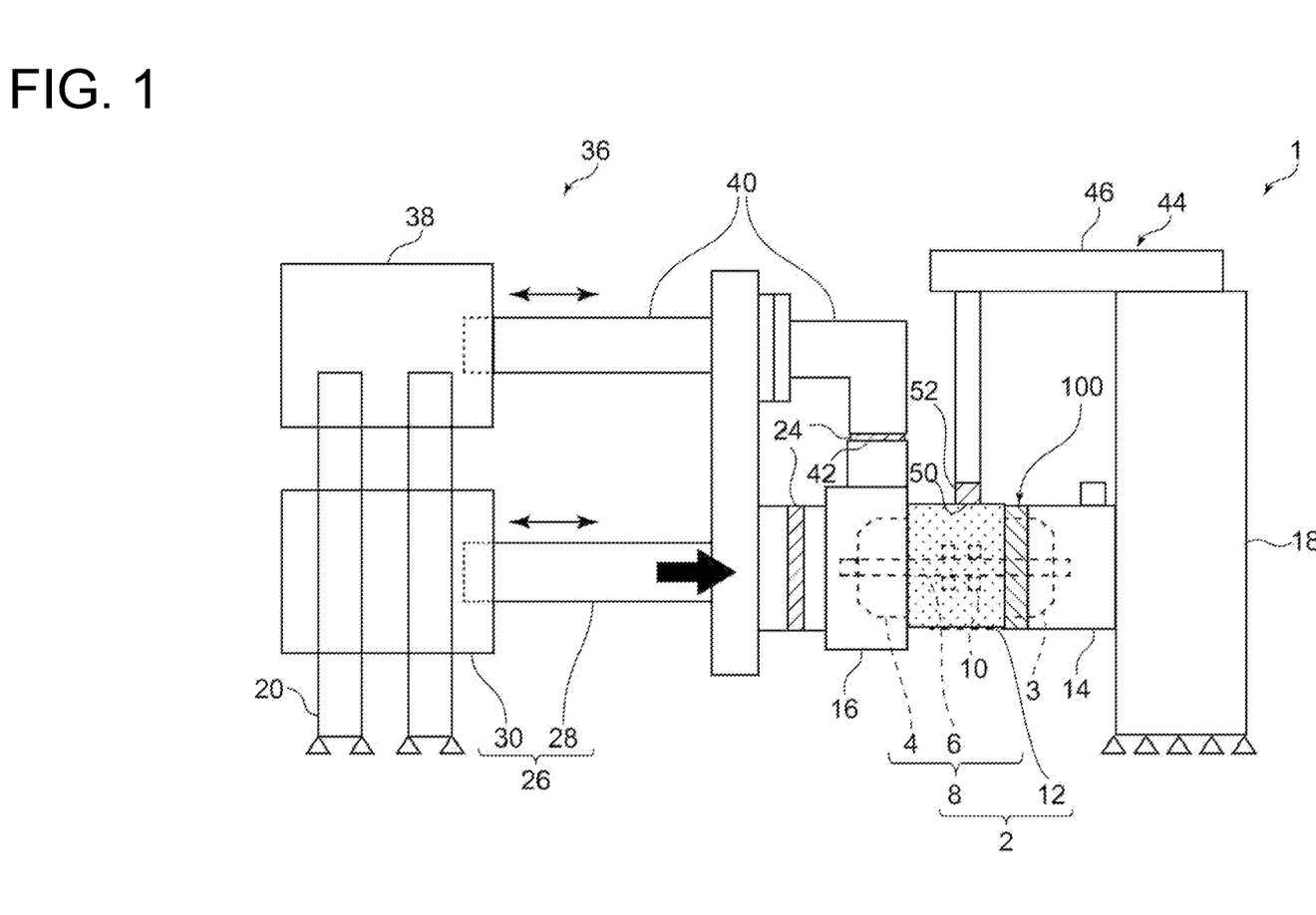
FIG. 1 is a schematic view showing an unbalance detection device using a vibration isolation holding device according to at least one embodiment of the present invention.
Figure 2:
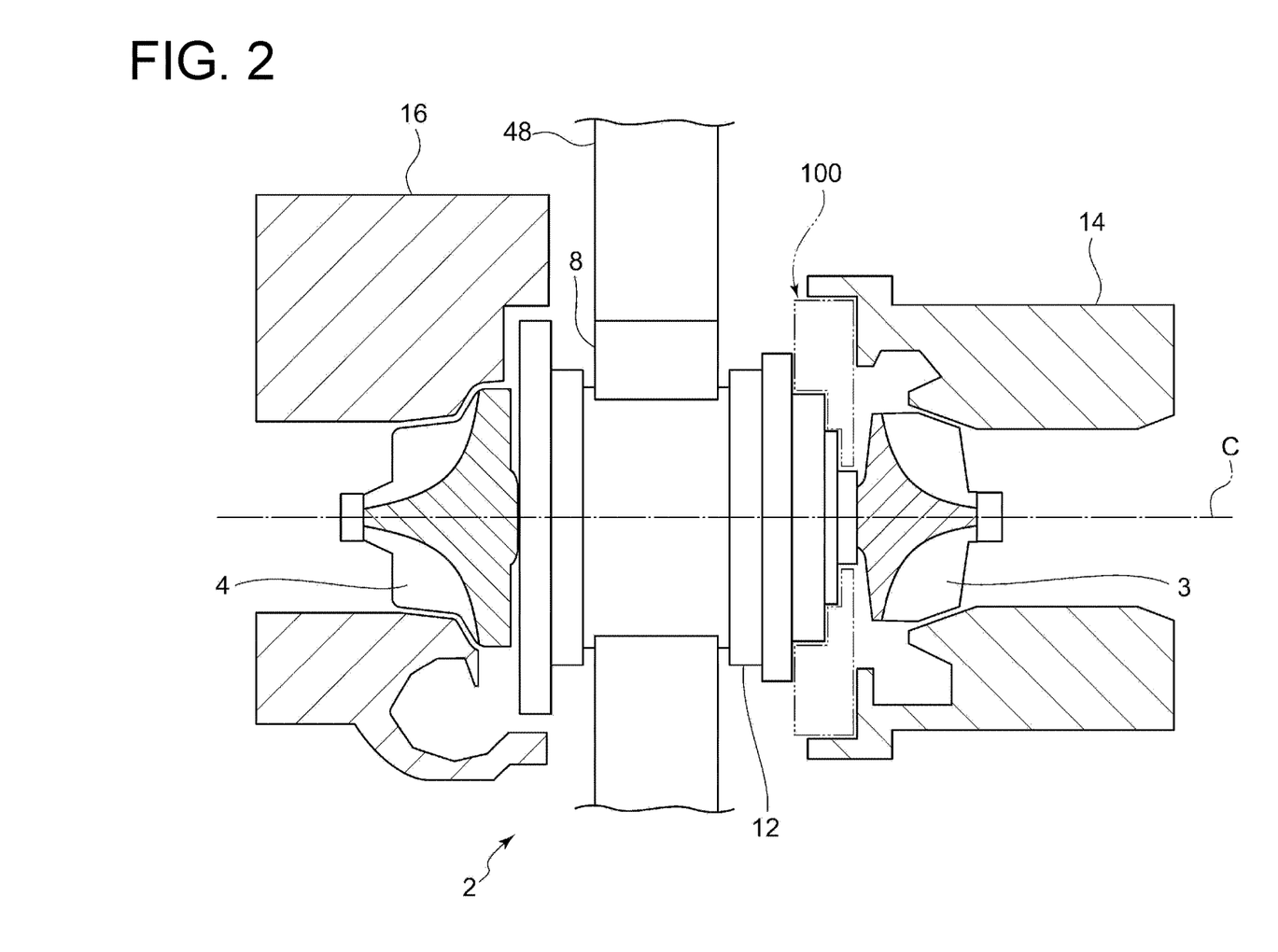
FIG. 2 is an enlarged view of the vicinity of the vibration isolation holding device in FIG. 1.

FIG. 1 is a schematic view showing an unbalance detection device 1 using a vibration isolation holding device 100 according to at least one embodiment of the present invention. FIG. 2 is an enlarged view of the vicinity of the vibration isolation holding device 100 in FIG. 1. In the following embodiments, a cartridge 2 is treated as an object to be detected by the unbalance detection device 1. FIGS. 1 and 2 each show a state in which the cartridge 2 is held by the unbalance detection device 1.

The cartridge 2, which is the object to be detected, is a core component of a turbocharger, and includes a rotor 8 integrally coupling a turbine wheel 3 and a compressor wheel 4 by a rotational shaft 6, and a bearing housing 12 that houses a bearing 10 for supporting the rotor 8 rotatably. The cartridge 2 is applied to, for example, an automobile engine. In this case, the cartridge 2 is configured such that the turbine wheel 3 disposed in an exhaust passage of the engine rotates due to an exhaust gas discharged from the engine, thereby rotating the compressor wheel 4 coaxially coupled by the rotational shaft 6 in an intake passage of the engine, compressing intake air to the engine.

The unbalance detection device 1 holds the cartridge 2 which is the object to be detected, in an unbalance detection work. The unbalance detection device 1 supports the cartridge 2 to be a work target by nipping it from both sides with two housing members, namely, a turbine-side housing member 14 and a compressor-side housing member 16. More specifically, the unbalance detection device 1 supports the cartridge 2 by pressing one of the two housing members toward the other, in a state in which the turbine wheel 3 and the compressor wheel 4 of the cartridge 2 are housed inside the above-described turbine-side housing member 14 and compressor-side housing member 16, respectively. At this time, the vibration isolation holding device 100 to be described later is disposed between the turbine-side housing member 14 and the cartridge 2.

The vibration isolation holding device 100 may be disposed between the compressor-side housing member 16 and the cartridge 2. In the following description, the case will mainly be described in which the vibration isolation holding device 100 is disposed between the turbine-side housing member 14 and the cartridge 2. However, the same also applies to a case in which the vibration isolation holding device 100 is disposed between the compressor-side housing member 16 and the cartridge 2, unless particularly stated otherwise.

In the following embodiments, the cartridge 2 for a turbocharger will be described as the object to be detected. Nevertheless, in other embodiments, a cartridge for a supercharger may be adopted, which drives the compressor wheel 4 by power from a crank shaft (not shown) or an electric motor. In this case as well, the unbalance detection device 1 supports the cartridge 2 by nipping it from both sides. The cartridge 2 is composed of the rotor 8 including the compressor wheel 4 and the rotational shaft 6, and the bearing housing 12 that houses the bearing 10 for supporting the rotor 8 rotatably.

As shown in FIG. 1, the unbalance detection device 1 includes a turbine-side base member 18 and the compressor-side base member 20 each fixed to, for example, a floor of a factory so as not to move when holding the cartridge 2. The turbine-side base member 18 is connected to the turbine-side housing member 14, and the compressor-side base member 20 is connected to the compressor-side housing member 16.

In FIG. 1, arranging the vibration isolation holding device 100 between the turbine-side housing member 14 and the cartridge 2, vibration isolation on the side of the turbine-side housing member 14 as viewed from the cartridge 2 is performed. On the other hand, vibration isolation on the side of the compressor-side housing member 16 as viewed from the cartridge 2 is performed by a vibration isolation member 24 including an elastic material, such as rubber. In the present embodiment, the vibration isolation holding device 100 is thus arranged on one side of the cartridge 2. However, the vibration isolation holding member 100 may also be arranged between the cartridge 2 and the compressor-side housing 16 (that is, the vibration isolation holding members 100 may be arranged on both sides of the cartridge 2). In this case, vibration isolation on the side of the compressor-side housing 16 as viewed from the cartridge 2 can also be performed by the vibration isolation holding member 100. Thus, the vibration isolation member 24 of FIG. 1 may be omitted. In this case, the compressor-side housing member 16 and a coupling member 40 may be integrated with each other.

In FIG. 1, the turbine-side base member 18 and the turbine-side housing member 14 are shown as separate members. However, they may be integrated with each other.

The compressor-side base member 20 is provided with a pressing device 26. The pressing device 26 is configured to press the compressor-side housing member 16 toward the cartridge 2. The pressing device 26 includes a pressing rod 28 connected to the compressor-side housing member 16 and a piston device 30 for pushing out the pressing rod 28 toward the compressor-side housing member 16. The piston device 30 pushes out the pressing rod 28 toward the compressor-side housing member 16, thereby pressing the compressor-side housing member 16 toward the cartridge 2.

At this time, the pressing device 26, the compressor-side housing member 16, the cartridge 2, the turbine-side housing member 14, and the turbine-side base member 18 are arranged in this order along the pressing direction (a direction of an arrow in FIG. 1), and thus a pressing force by the pressing device 26 is transmitted to the turbine-side base member 18 via the above arrangement. Then, the cartridge 2 is supported by the pressing force from the pressing device 26 and a reactive force from the turbine-side base member 18 fixed to the floor. That is, the unbalance detection device 1 presses each of the compressor-side housing member 16 and the turbine-side housing member 14 toward the bearing housing 12, thereby supporting the cartridge 2.

An air supply device 36 for directing air to the cartridge 2 at the time of the detection work is connected to the compressor-side housing member 16. The air supply device 36 includes a blower 38 for pressure-feeding air and the coupling member 40 for coupling the blower 38 to the compressor-side housing member 16. The coupling member 40 is configured to be expandable, is coupled to an intake port 42 disposed above the cartridge 2 supported by the pressing device 26, and introduces air via a hollow draft air duct.

The unbalance detection device 1 also includes an oiling device 44 for supplying lubricant oil to the bearing 10 housed in the bearing housing 12. The oiling device 44 includes a first support arm 46 and a second support arm 48. The first support arm 46 extends from the top of the turbine-side base member 18 to the above of the cartridge 2 supported by the unbalance detection device 1. The second support arm 48 extends downward from the tip of the first support arm 46 to an oiling portion 50 for the cartridge 2. The first support arm 46 and the second support arm 48 are configured to be expandable in the horizontal direction and the vertical direction, respectively, so as to correspond to the position of the cartridge 2.

The tip of the second support arm 48 is connected to the oiling portion 50 for the cartridge 2 via a vibration isolation member 52.

In the unbalance detection work, first, in the unbalance detection device 1, the pressing device 26 is operated to support the cartridge 2 to be detected. At this time, the vibration isolation holding device 100 is arranged between the turbine-side housing member 14 and the cartridge 2, and the cartridge 2 is held to be nipped between the turbine-side housing member 14 and the compressor-side housing member 16, while interposing the vibration isolation holding device 100 by the pressing device 26. Then, air is supplied to the held cartridge 2 by the air supply device 36 while supplying lubricant oil from the oiling device 44. The air supplied from the air supply device 36 rotates the turbine wheel 3 and the compressor wheel 4. Moreover, the vibration isolation holding device 100 includes a built-in vibration sensor for detecting a vibration, as will be described later. Detecting the vibration generated in the rotary driven cartridge 2, evaluation of unbalance is made. At this time, the vibration isolation holding device 100 can successfully provide vibration isolation of the cartridge 2 from the surroundings as will be described later, allowing high-quality unbalance evaluation.

Figure 3:
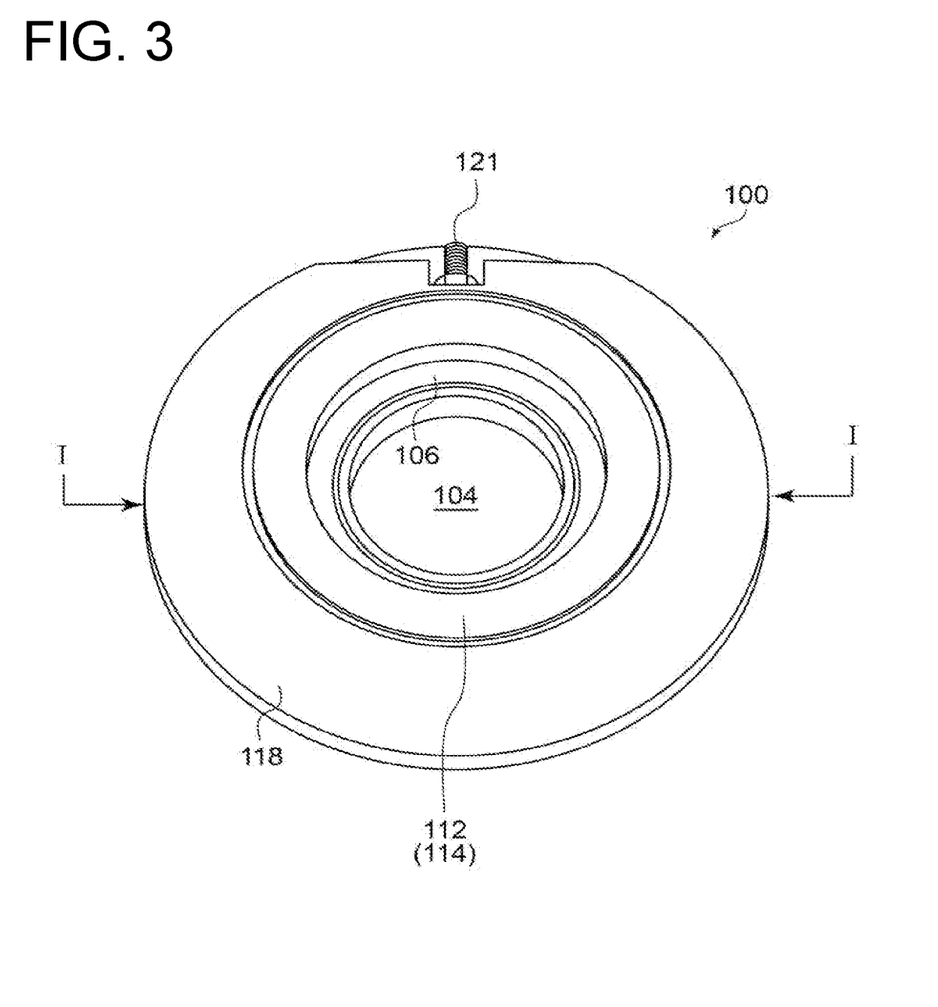
FIG. 3 is a perspective view showing the overall configuration of the vibration isolation holding device according to an embodiment of the present invention.
Figure 4:
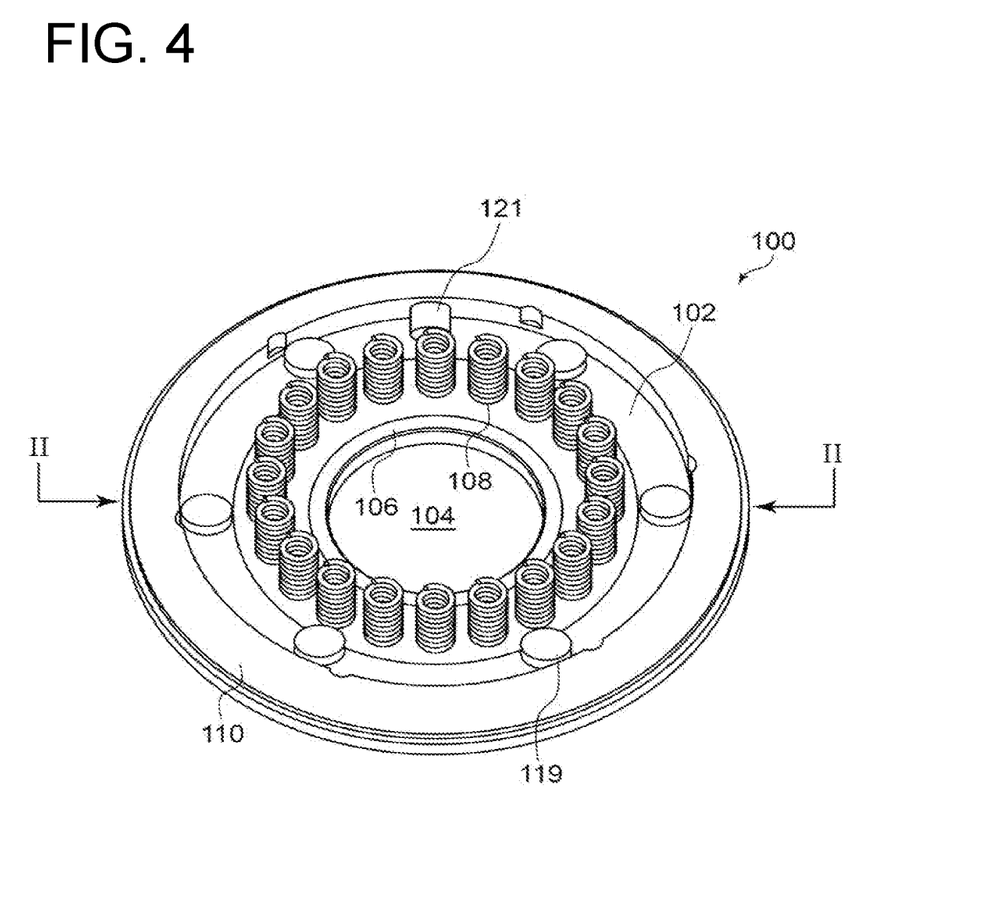
FIG. 4 is an exploded perspective view showing the internal configuration of the vibration isolation holding device in FIG. 3.
Figure 5:
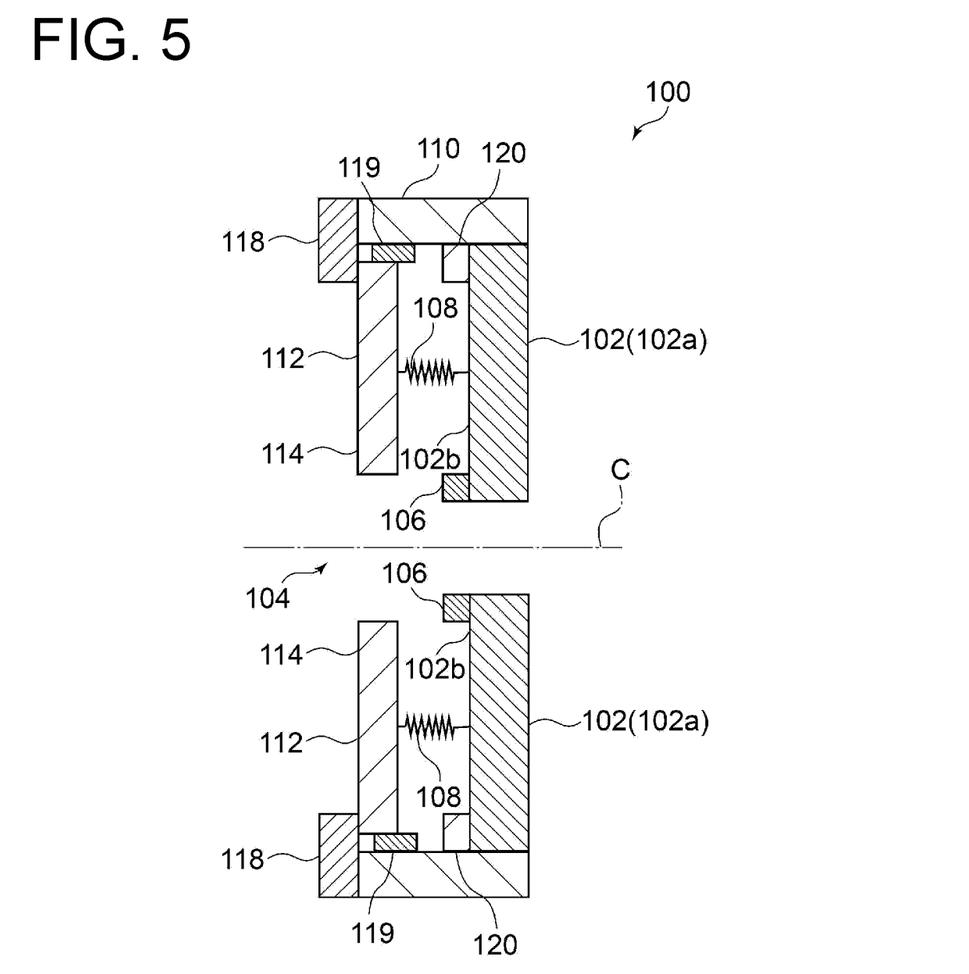
FIG. 5 is a cross-sectional view taken along line I-I in FIG. 3.
Figure 6:
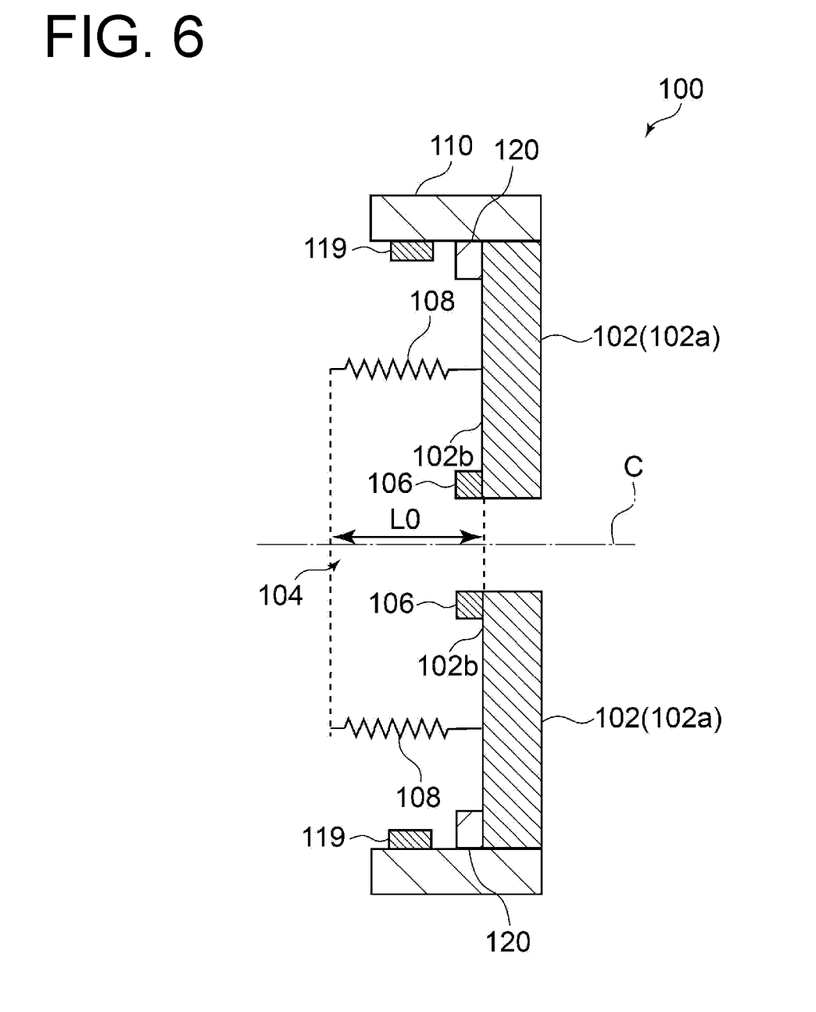
FIG. 6 is a cross-sectional view taken along line II-II in FIG. 4.

Subsequently, the vibration isolation holding device 100 will be described. FIG. 3 is a perspective view showing the overall configuration of the vibration isolation holding device 100 according to an embodiment of the present invention. FIG. 4 is an exploded perspective view showing the internal configuration of the vibration isolation holding device 100 in FIG. 3. FIG. 5 is a cross-sectional view taken along line I-I in FIG. 3. FIG. 6 is a cross-sectional view taken along line II-II in FIG. 4. FIGS. 4 and 6 show a partially exploded state by removing an abutment member 112 and a first regulating portion 118 from the vibration isolation holding device 100 in FIGS. 3 and 5, respectively. Moreover, a center axis C shown in each of FIGS. 5 and 6 is a reference axis along the rotational shaft 6 of the cartridge 2, when the cartridge 2 is held.

The vibration isolation holding device 100 includes a body portion 102. The body portion 102 is a disc-shaped member arranged such that the center axis is along the axial direction when the cartridge 2 is held. The body portion 102 includes a first surface 102a facing the turbine-side housing member 14 and the second surface 102b facing the bearing housing 12 of the cartridge 2. The first surface 102a and the second surface 102b are arranged so as to cross the axial direction of the rotational shaft 6.

In the center of the body portion 102, a hole portion 104 is disposed, which opens into a substantially circular shape radially inward. The turbine wheel 3 and the rotational shaft 6 of the cartridge 2 can be inserted through the hole portion 104. At the edge of the hole portion 104, a seal member 106 made of an elastic material, such as rubber, is arranged along the circumferential direction. The seal member 106 contacts the bearing housing 12 when the cartridge 2 is held by the vibration isolation holding device 100. The seal member 106 is configured to be able to make the bearing housing 12 and the vibration isolation holding device 100 densely engage each other.

On the second surface 102b of the body portion 102, at least one biasing member 108 is placed, which is disposed between the second surface 102b and the abutment member 112. The biasing member 108 extends along the axial direction between the second surface 102b and the abutment member 112. For example, an elastic structure, such as a coil spring, can be used as the biasing member 108.

In the present embodiment, as shown in FIG. 4, the plurality of biasing members 108 are disposed along the circumferential direction, centered on the axial direction of the rotational shaft 6. The plurality of biasing members 108 are arranged in a row along the circumferential direction, between the hole portion 104 and a side wall 110 extending in the axial direction along the circumferential edge of the body portion 102. The number and interval of the biasing members 108 may be optional.

Moreover, the vibration isolation holding device 100 includes an abutment member 112 with an abutment surface 114 directly abutting on the bearing housing 12, when holding the cartridge 2. A biasing force is acted on the abutment member 112 by the biasing member 108 disposed between the abutment member 112 and the body portion 102. The abutment member 112 is configured to be movable along the axial direction, in accordance with a load received from the bearing housing 12 when abutting on the bearing housing 12.

The abutment surface 114 of the abutment member 112 has an area corresponding to the surface shape of the bearing housing 12 which is an object of contact. In the present embodiment, the abutment surface 114 has a ring shape as viewed from the axial direction, so that the bearing housing 12 can uniformly be held along the circumferential direction.

On the second surface 102b of the body portion 102, the side wall 110 extending in the axial direction along the edge is disposed, on the radially outside of these biasing members 108. Then, the first regulating portion 118 protruding radially inward is disposed at the tip of the side wall (an end part on the side of the cartridge 2). The first regulating portion 118 contacts the abutment surface 114 from an opposite side to the body portion 102 as viewed from the abutment member 112, thereby regulating a moving range of the abutment member 112 in the axial direction.

The biasing member 108 disposed between the body portion 102 and the abutment member 112 has a natural length LO which is longer than an interval between the body portion 102 and the first regulating portion 118, as shown in FIGS. 4 and 6. The biasing member 108 of the present embodiment has the natural length LO which is greater than the axial length of the side wall 110 (FIGS. 4 and 6 each show a state in which the abutment member 112 is removed, and thus the free biasing member 108 protrudes higher than the side wall 110). On the other hand, in the completed vibration isolation holding device 100 where the abutment member 112 is embedded, as shown in FIGS. 3 and 5, the axial position of the abutment member 112 is regulated by the first regulating portion 118, making the biasing member 108 shorter than the natural length LO. That is, in the vibration isolation holding device 100, the biasing member 108 is mounted between the body portion 102 and the abutment member 112 while being compressed to be shorter than the natural length LO. Thus, the load by the biasing member 108 acts on each of the body portion 102 and the abutment member 112.

As shown in FIGS. 3 and 4, the vibration isolation holding device 100 is provided with a vibration detection sensor 121 for detecting the vibration of the cartridge 2 at the time of the unbalance detection work. The vibration detection sensor 121 is configured to be able to detect the vibration of the cartridge 2 as an electric signal and to transmit the electric signal to an analysis device which is constituted by a computation processing device, such as a computer, arranged outside. In the present embodiment, the vibration detection sensor 121 is directed radially inward from the side wall 110 disposed along the circumferential edge of the body portion 102. FIG. 4 shows a state in which the tip of the vibration detection sensor 121 is disposed so as to face the biasing members 108. Then, the vibration detection sensor 121 contacts the surface of the abutment member 112, if the biasing members 108 are compressed by attaching the abutment member 112 to the state of FIG. 4. At the time of the vibration detection work, the vibration detection sensor 121 moves integrally with the abutment member 112, making it possible to detect the vibration generated in the cartridge 2 that contacts the abutment member 112.

FIGS. 7A to 7D are schematic views of a state in respective stages of a clamping work for the cartridge 2 by the vibration isolation holding device 100. In order to comprehensively describe the configuration of the vibration isolation holding device 100, FIGS. 7A to 7D are illustrated simply as compared with FIGS. 3 to 6 (in particular, only one side of the center axis C is shown simply, but the same also applies to the other side, unless particularly stated otherwise).

Figure 7A:
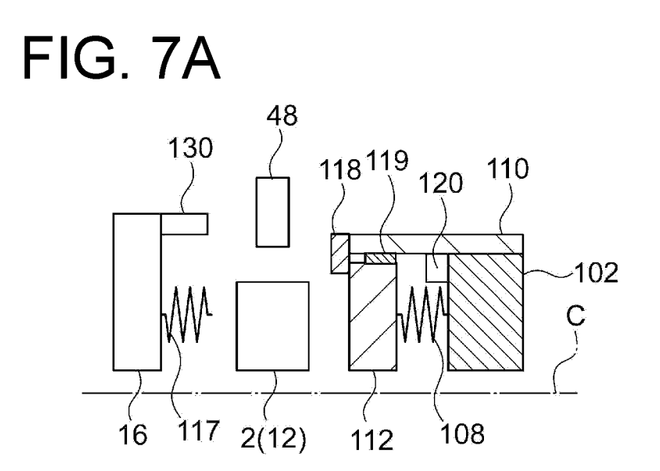
FIGS. 7A to 7D are schematic views of a state in respective stages of a clamping work for a cartridge 2 by the vibration isolation holding device.

FIG. 7A shows the stage where the abutment member 112 does not contact the cartridge 2 to be held. At this time, since a load does not act on the abutment member 112 from the cartridge 2, the abutment member 112 is pressed against the first regulating portion 118 with the biasing force by the biasing member 108.

Figure 7B:
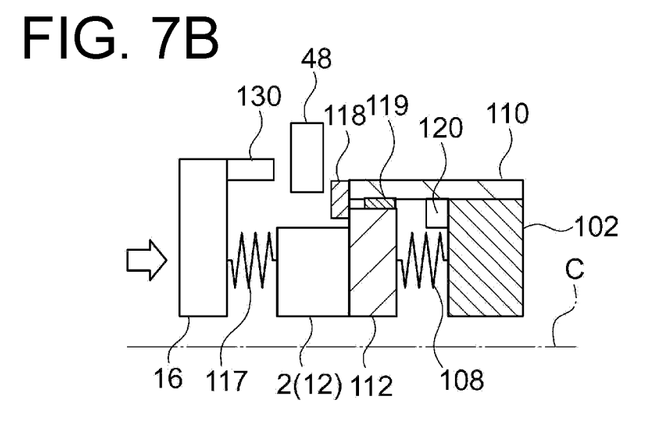

FIG. 7B shows a state in which the compressor-side housing member 16 is moved toward the cartridge by the pressing device 26, thereby bringing the cartridge 2 into contact with the abutment member 112. At this time, the load received by the abutment member 112 from the cartridge 2 is less than a lower limit reference value and is smaller than the biasing force received by the abutment member 112 from the biasing member 108. Thus, the abutment member 112 is pressed against the first regulating portion 118 with the biasing force by the biasing member 108, maintaining the same state as FIG. 7A.

Figure 7C:
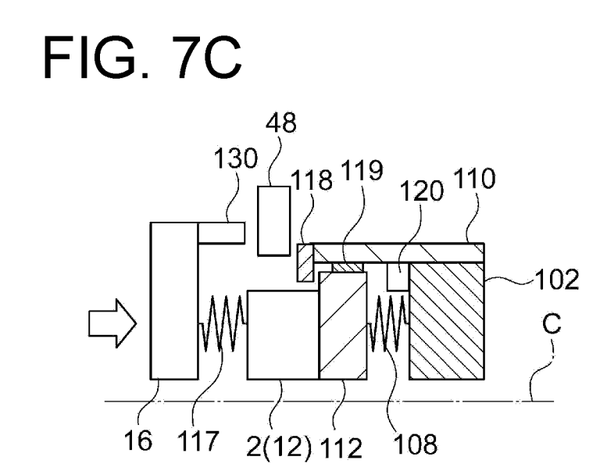

As shown in each view of FIGS. 7A to 7D, a biasing member 117 is disposed between the cartridge 2 and the compressor-side housing member 16, on the opposite side to the vibration isolation holding device 100 as viewed from the cartridge 2. The biasing member 117 is configured to be able to elastically hold the cartridge 2 by being interposed between the bearing housing 12 of the cartridge 2 and the compressor-side housing member 16. Arranging the vibration isolation holding device 100 in place of the biasing member 117, the cartridge 2 may be supported from both sides by the two vibration isolation holding devices 100, FIG. 7C shows a case in which the load received by the abutment member 112 from the cartridge 2 increases as compared with FIG. 7B, and the load exceeds the lower limit reference value. At this time, the load received by the abutment member 112 from the cartridge 2 is greater than the biasing force received from the biasing member 108. Thus, the abutment member 112 is diverged from the first regulating portion 118 and moves toward the body portion 102. The abutment member 112 diverged from the first regulating portion 118 moves while resisting the biasing force received from the biasing member 108, and is stabled at a position corresponding to a balance between the load received from the cartridge 2 and the biasing force received from the biasing member 108 (that is, the abutment member 112 is supported to float between the body portion 102 and the first regulating portion 118).

As shown in FIGS. 4 to 6, and 7A to 7D, the side wall 110 is provided with second regulating portions 119 for regulating radial displacement of the abutment member 112 by abutting on the abutment member 112 from radially outside. The plurality of second regulating portions 119 are arranged at circumferentially different positions, respectively, along the circumferential direction of the body portion 102. Thus, also in a case as in FIG. 7C, where the abutment member 112 is held between the first regulating portion 118 and the body portion 102 with the balance between the load received from the cartridge 2 and the biasing force received from the biasing member 108, it is possible to suppress the radial displacement of the abutment member 112 by the second regulating portions 119 and to maintain the stable orientation.

Figure 7D:
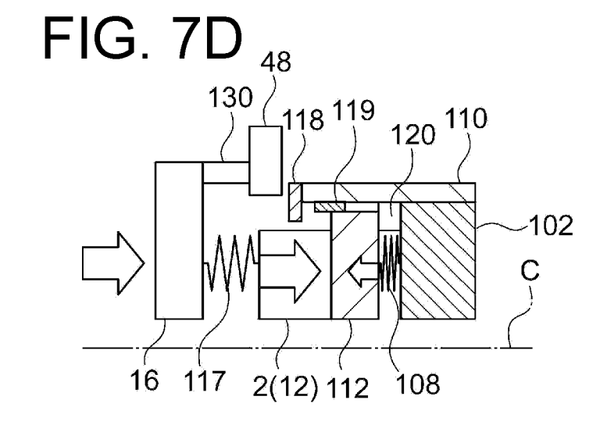

FIG. 7D shows a case in which the load received by the abutment member 112 from the cartridge 2 further increases as compared with FIG. 7C, and the load exceeds an upper limit reference value. At this time, the abutment member 112 contacts a third regulating portion 120 provided in the body portion 102, regulating the axial position. That is, if the abutment member 112 receives an excessive load from the cartridge, the abutment member 112 contacts the third regulating portion 120, avoiding movement exceeding an allowable range. Thus, it is possible to protect the biasing member 108, even if, for example, an excessive load that plastically deforms the biasing member 108 is input.

In the present embodiment, the third regulating portion 120 is configured to contact the abutment member 112 from the opposite side to the abutment surface 114, if the load from the cartridge 2 is excessive. The third regulating portion 120 is disposed on the side of the second surface 102b of the body portion 102 and has a predetermined height along the axial direction. The height of the third regulating portion 120 is set so as to correspond to the position of the abutment member 112 in a case in which a load equal to the upper limit reference value is received, for example.

In the example of FIGS. 7A to 7D, the compressor-side housing member 16 is provided with a stopper 130 which is configured to contact the second support arm 48 if the load received by the abutment member 112 from the cartridge 2 exceeds the upper limit reference value. Thus, it is possible to protect the biasing member 108 together with the above-described third regulating portion 120, if the load is excessive.

Figure 8:
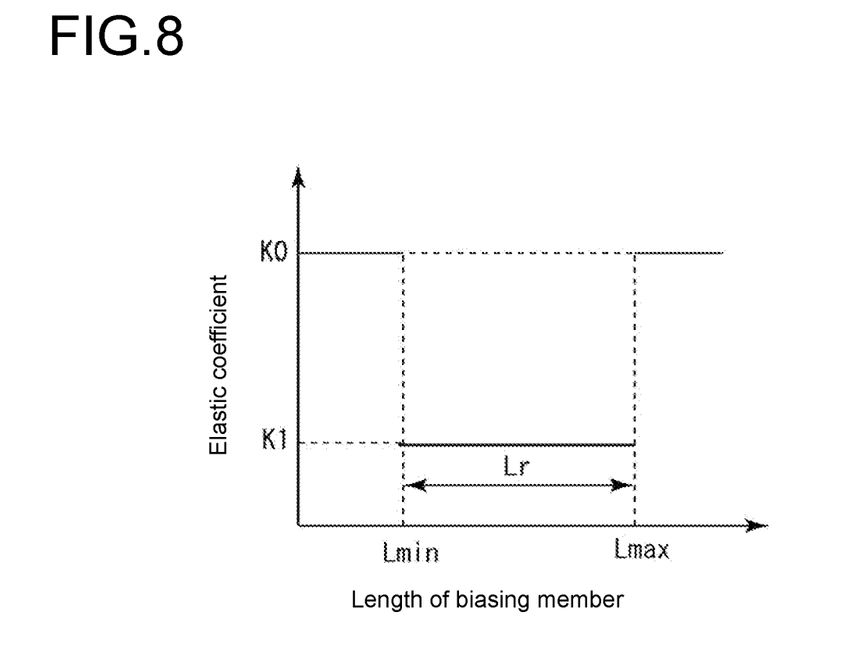
FIG. 8 is a graph showing an example of elastic characteristics of a biasing member.

Moreover, the biasing member 108 may have elastic characteristics to handle an operation range of the abutment member 112. FIG. 8 shows an example of the elastic characteristics of the biasing member 108. The biasing member 108 has an operation range Lr defined by an upper limit length Lmax and a lower limit length Lmin. The upper limit length Lmax corresponds to the case in which the load from the cartridge 2 is equal to the lower limit reference value. The lower limit length Lmin corresponds to the case in which the load from the cartridge 2 is equal to the upper limit reference value. As shown in FIG. 8, the elastic characteristics of the biasing member 108 have the elastic characteristics that an elastic coefficient indicates a small value K1 (softened) in the operation range Lr where a length L of the biasing member 108 is defined from the lower limit length Lmin to the upper limit length Lmax, and that the elastic coefficient indicates a large value K0 (hardened) in another range. Using the coil spring having such elastic characteristics as the biasing member 108, it is possible to suppress excessive deformation in the biasing member 108 outside the operation range Lr and to ensure good reliability, while achieving good vibration isolation characteristics by flexibly holding the cartridge 2 in the operation range Lr.

As described above, according to at least one embodiment of the present invention, the position of the abutment member 112 is regulated to contact the first regulating portion 118 by the load (biasing force) received from the biasing member 108, if the load received by the abutment surface 114 from the bearing housing 12 is not greater than a predetermined value, when the cartridge 2 is held. On the other hand, if the load received by the abutment surface 114 from the bearing housing 12 exceeds the predetermined value, the abutment member 112, which is in contact with the first regulating portion 118, is diverged from the first regulating portion 118 against the load (biasing force) received from the biasing member 108, and moves toward the body portion 102. At this time, the cartridge 2 is elastically held by the body portion 102 via the biasing member 108 in a state where the abutment member 112 is in contact with the bearing housing 12. Such an elastic holding structure allows a sufficient clamping force to act on the bearing housing 12, while ensuring a good vibration isolation property even if the very flexible biasing member 108 is used. Moreover, since the length of the biasing member 108 is regulated to be always not greater than the natural length L0 by the first regulating portion 118, it is possible to keep the device size compact and also to easily introduce the device into a limited working space.

INDUSTRIAL APPLICABILITY

At least one embodiment of the present invention can be used for a vibration isolation holding device for holding a cartridge, which includes a rotor having a wheel and a rotational shaft, a bearing for supporting the rotor rotatably, and a bearing housing for housing the bearing, while isolating an external vibration.

REFERENCE SIGNS LIST

1 Unbalance detection device
2 Cartridge
3 Turbine wheel
4 Compressor wheel
6 Rotational shaft
8 Rotor
10 Bearing
12 Bearing housing
14 Turbine-side housing member
16 Compressor-side housing member
18 Turbine-side base member
20 Compressor-side base member
26 Pressing device
36 Air supply device
44 Oiling device
50 Oiling portion
52 Vibration isolation member
100 Vibration isolation holding device
102 Body portion
104 Hole portion
106 Seal member
108, 117 Biasing member
110 Side wall
112 Abutment member
118 First regulating portion
119 Second regulating portion
120 Third regulating portion
130 Stopper

The invention claimed is:

1. A vibration isolation holding device configured for holding a cartridge, which includes a rotor having a wheel and a rotational shaft, a bearing configured for supporting the rotor rotatably, and a bearing housing configured for housing the bearing, while isolating a vibration, the device comprising:

a body portion;

an abutment member arranged between the body portion and the bearing housing, and having an abutment surface abutting on the bearing housing, when the cartridge is held;

at least one biasing member disposed between the body portion and the abutment member along an axial direction of the rotational shaft; and a first regulating portion configured for regulating a position of the abutment member with respect to the body portion, so as to make an interval between the body portion and the abutment member shorter than a natural length of at least one the biasing member, and wherein the first regulating portion is fixed to the body portion, and is configured to be able to contact the abutment surface from an opposite side to the body portion as viewed from the abutment member.

2. The vibration isolation holding device according to claim 1, wherein the natural length of the at least one biasing member is longer than an interval between the body portion and the first regulating portion.

3. The vibration isolation holding device according to claim 1, wherein the body portion is a disc-shaped member crossing the axial direction of the rotational shaft, when the cartridge is held, and wherein the first regulating portion is configured to protrude radially inward from a side wall extending from a circumferential edge of the disc-shaped member along the axial direction.

4. The vibration isolation holding device according to claim 1, comprising a second regulating portion for regulating displacement in a radial direction of the at least one biasing member.

5. The vibration isolation holding device according to claim 4, comprising a third regulating portion configured to contact the abutment member from an opposite side to the abutment surface, if a load from the bearing housing on the abutment surface exceeds a preset upper limit reference value.

6. The vibration isolation holding device according to claim 1,

Wherein the at least one biasing member includes a plurality of biasing members disposed along a circumferential direction, centered on the axial direction of the rotational shaft.

7. The vibration isolation holding device according to claim 6, wherein the at least one biasing member is configured to have an elastic coefficient smaller than a predetermined value in an operational range of the abutment member, as compared with another range.

8. The vibration isolation holding device according to claim 1, wherein the wheel is a turbine wheel, and wherein the body portion is connected to a turbine housing configured to surround the turbine wheel.

9. The vibration isolation holding device according to claim 1, wherein the wheel is a compressor wheel, and wherein the body portion is connected to a compressor housing configured to surround the compressor wheel.

10. A vibration isolation holding device configured for holding a cartridge, which includes a rotor having a wheel and a rotational shaft, a bearing configured for supporting the rotor rotatably, and a bearing housing configured for housing the bearing, while isolating a vibration, the device comprising:

a body portion;

an abutment member arranged between the body portion and the bearing housing, and having an abutment surface abutting on the bearing housing, when the cartridge is held;

at least one biasing member disposed between the body portion and the abutment member along an axial direction of the rotational shaft;

a first regulating portion configured for regulating a position of the abutment member with respect to the body portion, so as to make an interval between the body portion and the abutment member shorter than a natural length of the at least one biasing member; and an additional regulating portion configured to contact the abutment member from an opposite side to the abutment surface, if a load from the bearing housing on the abutment surface exceeds a preset upper limit reference value.

* * * * *